(12) United States Patent
Zhu

(10) Patent No.: US 9,900,272 B2
(45) Date of Patent: Feb. 20, 2018

(54) METHOD AND SERVER FOR TRANSMITTING APPLICATION TEST DATA

(71) Applicant: Tencent Technology (Shenzhen) Company Limited, Shenzhen (CN)

(72) Inventor: Jian Zhu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 232 days.

(21) Appl. No.: 14/743,808

(22) Filed: Jun. 18, 2015

(65) Prior Publication Data

US 2015/0288630 A1 Oct. 8, 2015

Related U.S. Application Data

(63) Continuation of application No. PCT/CN2014/073676, filed on Mar. 19, 2014.

(30) Foreign Application Priority Data

Mar. 26, 2013 (CN) .......................... 2013 1 0100866

(51) Int. Cl.
*H04L 12/58* (2006.01)
*H04L 12/26* (2006.01)
*H04L 29/08* (2006.01)

(52) U.S. Cl.
CPC ............ *H04L 51/046* (2013.01); *H04L 43/50* (2013.01); *H04L 51/04* (2013.01); *H04L 51/08* (2013.01); *H04L 67/1095* (2013.01)

(58) Field of Classification Search
CPC .............................. H04L 12/581; H04L 51/04
See application file for complete search history.

(56) References Cited

U.S. PATENT DOCUMENTS 6,047,340 A * 4/2000 Kase ....................... G06F 13/28
710/29
2002/0184383 A1* 12/2002 Song ................... H04L 41/0896
709/235

(Continued)

FOREIGN PATENT DOCUMENTS

| CN | 101001413 A | 7/2007 |
|---|---|---|
| CN | 101930372 A | 12/2010 |

OTHER PUBLICATIONS

Tencent Technology, IPRP, PCT/CN2014/073676, dated Sep. 29, 2015, 6 pgs.

(Continued)

*Primary Examiner* — Jeong S Park
(74) *Attorney, Agent, or Firm* — Morgan, Lewis & Bockius LLP

(57) ABSTRACT

A method and server for transmitting application test data are provided, the method including: obtaining data to be transmitted by an application; dividing the data into a plurality of data sections, wherein each data section is less than a maximum transmission capacity that the application can transmit one time; and controlling the application to transmit the plurality of data sections sequentially, wherein upon the completion of the transmission of a data section, the application is reinitiated to automatically transmit a next data section. The method and server for transmitting application test data saves testing costs and enhances operational efficiency.

20 Claims, 2 Drawing Sheets

(56) References Cited

U.S. PATENT DOCUMENTS

| 2004/0003325 A1* | 1/2004 | Muller | G06F 11/36 |
| | | | 714/38.14 |
| 2008/0040503 A1* | 2/2008 | Kleks | H04L 63/145 |
| | | | 709/236 |
| 2009/0222523 A1* | 9/2009 | Williams | H04L 51/04 |
| | | | 709/206 |
| 2010/0080143 A1* | 4/2010 | Topaltzas | H04L 47/10 |
| | | | 370/253 |

OTHER PUBLICATIONS

Tencent Technology, ISRWO, PCT/CN2014/073676, dated Jun. 30, 2014, 13 pgs.

* cited by examiner

METHOD AND SERVER FOR TRANSMITTING APPLICATION TEST DATA

CROSS-REFERENCE TO RELATED APPLICATIONS

This application is a continuation application of PCT Patent Application No. PCT/CN2014/073676, entitled "Method and System for Transmitting Application Test Data," filed on Mar. 19, 2014, which claims the benefit and priority of Chinese Patent Application No. 201310100866.5, entitled "Method and Server for Transmitting Application Test Data," filed on Mar. 26, 2013, both of which are incorporated by reference in their entirety.

TECHNICAL FIELD

The present application relates to data transmission technology, and more particularly to a method and server for transmitting application test data.

BACKGROUND

With the development of the mobile internet technology, the portable mobile terminal has become a must-have for users.

The users often use the portable mobile terminals to send and/or receive text massages, audio, pictures, or videos. In designing portable mobile terminals that conveniently transmit text massages, audio, pictures, or videos data, data transmission testing between the portable terminals needs to be conducted to detect and eliminate any transmission issues to ensure that the portable terminals meet the requirements of the users.

The existing test methods generally use a controlling terminal connected to two portable mobile terminals. The controlling terminal provides the test data and controls the test data to be transmitted from one portable terminal to the other portable terminal. The applications that transmit data between the portable terminals can be improved in accordance with the transmission of the test data to meet the requirements of the users.

In testing data transmission between the portable mobile terminals, large amount of application test data is usually used. Due to software and hardware configuration issues, such as the memory, processor, and application compatibility issues, the application may freeze or crash during the transmission of large amount of test data. The application or the portable terminal might have to be restarted to resume the transmission of test data, which can result in damage to the testing equipment and/or low testing efficiency.

Thus, the existing method for transmitting application test data between portable mobile terminals has the issues of high testing costs and low efficiency, and there is a need to provide a technical solution to address the above mentioned issues. Please note that the disclosures in this section merely provide background information related to the present application, and are not necessarily prior art.

SUMMARY OF THE APPLICATION

The embodiments of the present application provide a method and server for transmitting application test data to the issues of high testing costs and low efficiency.

In accordance with the embodiments of the present application, a method for transmitting application test data is provided, the method including: obtaining data to be transmitted by an application; dividing the data into a plurality of data sections, wherein each data section is less than a maximum transmission capacity that the application can transmit one time; and controlling the application to transmit the plurality of data sections sequentially, wherein upon the completion of the transmission of a data section, the application is reinitiated to automatically transmit a next data section.

In accordance with the embodiments of the present application, a server for transmitting application test data is provided, the server including: a data acquisition module for obtaining data to be transmitted by the application; a data section generation module for dividing the test data into a plurality of data sections, wherein each data section is less than a maximum transmission capacity that the application can transmit one time; and a control module for controlling the application to transmit the plurality of data sections sequentially, wherein upon the completion of the transmission of a data section, the application is configured to automatically transmit a next data section.

In accordance with the method for transmitting application data, application test data is divided into a plurality of data sections, and the data sections are transmitted consequently; after the transmission of one data section, the application is reinitiated to automatically transmit the next data section. Thus, the application will not freeze or crash, which saves costs and enhances operational efficiency.

BRIEF DESCRIPTION OF THE DRAWINGS

To better illustrate the technical features of the embodiments of the present application, various embodiments of the present application will be briefly described in conjunction with the accompanying drawings.

DESCRIPTION OF EMBODIMENTS

The various preferred embodiments of the present application will be further described in conjunction with the accompanying drawings.

Figure 1:
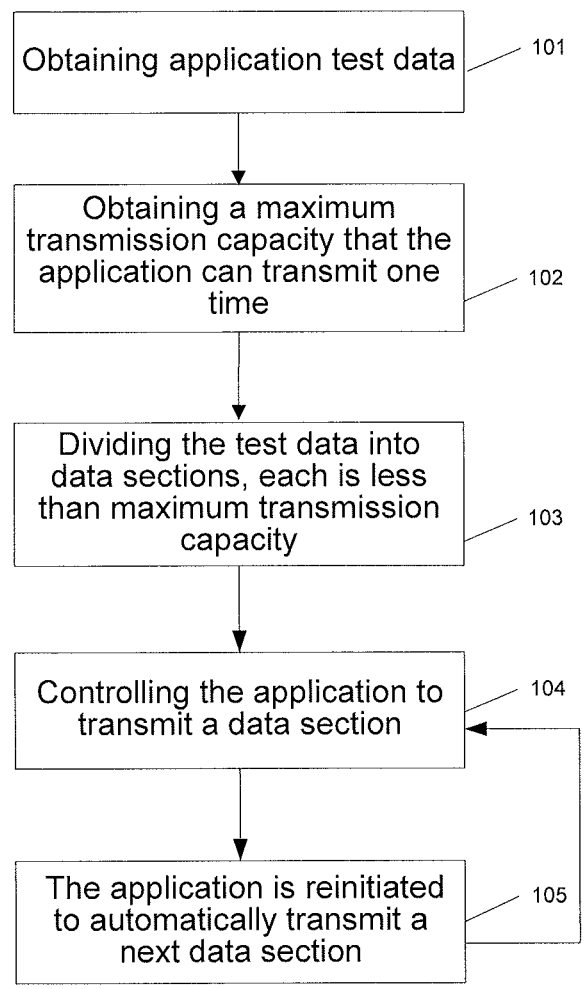
FIG. 1 is an exemplary block flowchart of a method for transmitting application test data in accordance with some embodiments of the present application.

FIG. 1 is an exemplary block flowchart of a method for transmitting application test data in accordance with some embodiments of the present application. The method for transmitting application test data includes:

101: obtaining application test data.

In this step, test data for transmission by an application is obtained. The test data typically include text data, image data, audio data and video data. The application is typically installed on a communication terminal. The communication terminal can be a computer, a mobile phone or a Personal Digital Assistant (PDA). The application can be an instant messaging application.

102: obtaining a maximum transmission capacity that the application can transmit one time.

In this step, the maximum transmission capacity that the application can transmit one time is obtained and saved.

The maximum transmission capacity that the application can transmit one time can be acquired by gradually increasing the amount of data transmitted by the application, until the application freezes or crashes. That amount of data is saved as the maximum transmission capacity.

103: dividing the test data into a plurality of data sections, wherein each data section is less than a maximum transmission capacity that the application can transmit one time.

After acquiring and saving the maximum transmission capacity that the application can transmit one time, the test data is divided into a plurality of data sections so that each data section is less than the maximum transmission capacity that the application can transmit one time. Thus the application will not freeze or crash during the data transmission, and test data can be transmitted smoothly by the application, which saves costs and enhances operational efficiency.

The amount of data in each data can be the same, or different. Each data section can also be numbered when the test data is divided so that the data sections can be sequentially transmitted by the application during the transmission test. There are a variety of ways to divide the test data. For example, if the test data is text data, the integrality of text data should be kept during the data division, as long as each data section is less than the maximum transmission capacity that the application can transmit one time.

104: controlling the application to transmit a data section.

105: the application is reinitiated to automatically transmit a next data section.

In Steps 104 and 105, the application transmits the plurality of data sections sequentially between two terminals until the last data section is transmitted. After the transmission of a data section, the application is reinitiated to automatically transmit a next data section until all data sections are transmitted.

In some embodiments, the test data includes a plurality of files, and each data section includes one or more files.

In some embodiments, controlling the application to transmit the plurality of data sections sequentially includes providing an identifier for each file to the application. The identifier of the file can be the file name plus the file path, and the application can use the identifier to automatically locate and transmit the file, which renders manual operation unnecessary.

The various functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Specifically, the method can be implemented using a script language, such as python using Instrumentation with Python. For example, the below scripts can be used to test transmitting 50 pictures to a mobile terminal, 10 pictures a time.

```
def copyFile(deviceid, file, i);
    os.system(r'adb -s'+deviceid +'push'+SrcPath+file[i]+MPath)
SrcPath=os.getcwd( )+'\\QTest\\autotest\\'
MPath='/sdcard/autotest/sendpic.txt'
file=['sendpic.txt','sendpic1.txt','sendpic2.txt','sendpic3.txt','sendpic4.txt']
for i in range(1,5):
    j=i-1;
    print("please rename/autotest/sendpic.txt file......")
    MonkeyRunner.sleep(15.0)
    systemAdbShe111(Send,'push'+FilePath+' '+SdcardPath)
    copyFile(Send,file[j],0)
    instrumentRun1(Send, SendAPKPackageName)
    print("send new sendpic.txt file is ok")
else:
    print('send msg is ok.')
```

It should be noted that, in the method for transmitting application test data in accordance with these embodiments of the present application, the terminal having an application sending the test data can be defined as a sending terminal, and the terminal having an application receiving the test data can be defined as a receiving terminal. During the transmission of the test data, the test data can be first saved to the sending terminal, and then is transmitted from the sending terminal to the receiving terminal. There could be either one or many sending terminals and receiving terminals, and the data transmission can be from one to many, from many to many, or from one to one.

In these embodiments, application test data is divided into a plurality of data sections, the data sections are transmitted consequently, and after the transmission of one data section, the application is reinitiated to automatically transmit the next data section. Thus, the application will not freeze or crash, which saves costs and enhances operational efficiency.

Figure 2:
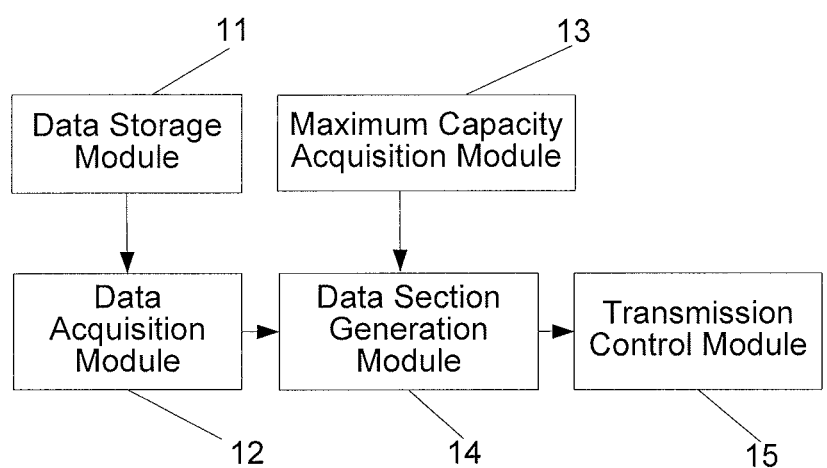
FIG. 2 is an exemplary structural block diagram of a server for transmitting application test data in accordance with some embodiments of the present application.

FIG. 2 is an exemplary structural block diagram of a server for transmitting application test data in accordance with some embodiments of the present application.

As shown in FIG. 2, the server includes a data storage module 11, a data acquisition module 12, a maximum capacity acquisition module 13, a data section generation module 14 and a control module 15. In these embodiments, the test data can include text data, image data, audio data and video data. The application can be an instant messaging application.

The data storage module 11 is used to save the test data to the sending terminal. The test data is transmitted from the sending terminal to the receiving terminal. The sending terminal sends the test data, and receiving terminal receives the test data.

The data acquisition module 12 is used to obtain test data to be transmitted by the application. The maximum capacity acquisition module 13 is used to obtain and save the maximum transmission capacity that the application can transmit one time. The data section generation module 14 is used to divide the data into a plurality of data sections, wherein each data section is less than the maximum transmission capacity that the application can transmit one time. The control module 15 is used to control the application to transmit the plurality of data sections sequentially, wherein upon the completion of the transmission of a data section, the application automatically transmits a next data section.

In some embodiments, the test data includes a plurality of files, and each data section includes one or more files.

In some embodiments, controlling the application to transmit the plurality of data sections sequentially includes providing an identifier for each file to the application. The identifier of the file can be the file name plus the file path, and the application can use the identifier to automatically locate and transmit the file, which renders manual operation unnecessary.

The various modules, units, and components described above, such as the data storage module 11, the data acquisition module 12, the maximum capacity acquisition module 13, the data section generation module 14 and the control module 15, can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

It should be noted that, in the method for transmitting application test data in accordance with these embodiments of the present application, the terminal having an application sending the test data can be defined as a sending terminal, and the terminal having an application receiving the test data can be defined as a receiving terminal. During the transmission of the test data, the test data can be first saved to the sending terminal, and then is transmitted from the sending terminal to the receiving terminal. There could be either one or a number of sending terminals and receiving terminals, and the data transmission can be from one to many, from many to many, or from one to one.

In these embodiments, the data section generation module 14 divides application test data into a plurality of data sections, the control module 15 controls the application to transmit the data sections consequently, and after the transmission of one data section, the application is reinitiated to automatically transmit the next data section. Thus, the application will not freeze or crash, which saves costs and enhances operational efficiency.

In accordance with the server for transmitting application test data of some embodiments of the present application, in view of the configuration of the server, after the transmission of one data section, the application is reinitiated to automatically transmit the next data section, which ensures that the data is transmitted smoothly by the application. Thus, the application will not freeze or crash, which saves costs and enhances operational efficiency.

It should be noted while the various embodiments of the present application are described in connection with application test data, the embodiments of the present application are not limited to application test data, but can be used to transmit any type of data.

The various embodiments of the present application are merely preferred embodiments, and are not intended to limit the scope of the present application, which includes any modification, equivalent, or improvement that does not depart from the spirit and principles of the present application, therefore, the scope of the present application only is defined in accordance with the claims.

What is claimed is:

1. A method for transmitting data, comprising:
at a computer device having one or more processors and memory storing programs for execution by the processors, wherein the computer device is installed with an instant messaging application:
obtaining the data that need to be transmitted by the instant messaging application;
detecting a transmission capacity associated with the amount of data that the instant messaging application can transmit within one transmission session, further including:
gradually increasing the amount of data to be transmitted by the instant messaging application within the transmission session without actual transmission of any data to another computing device; and
determining the transmission capacity of the transmission session until before the instant messaging application freezes or crashes;
after detecting the transmission capacity, dividing the data into a plurality of data sections according to the determined transmission capacity, wherein the respective amount of data contained in each data section is less than the transmission capacity; and
controlling the instant messaging application to transmit the plurality of data sections sequentially to the other computing device, wherein upon the completion of the transmission of each data section in a subset of the plurality of data sections, the instant messaging application automatically transmits a respective subsequent data section of the plurality of data sections.

2. The method of claim 1, wherein determining the transmission capacity further comprises:
obtaining the transmission capacity that the application can transmit within one transmission session; and
storing the transmission capacity in the memory of the computer device.

3. The method of claim 1, wherein the data is selected from a group consisted of text data, image data, audio data and video data.

4. The method of claim 1, wherein the computer device includes a sending terminal, the step of controlling the application to transmit the plurality of data sections sequentially comprising:
controlling the application to transmit the plurality of data sections sequentially from the sending terminal to one or more computer devices each including a respective receiving terminal.

5. The method of claim 1, wherein the data comprise test data for the application.

6. The method of claim 5, wherein the test data comprise a plurality of files.

7. The method of claim 6, wherein controlling the application to transmit the plurality of data sections sequentially comprising providing an identifier for each file to the application.

8. The method of claim 7, wherein the identifier includes a file name and a file path of the respective file.

9. The method of claim 1, wherein at least one of the plurality of data sections includes one or more files.

10. A computer device, comprising:
one or more processors; and
memory having instructions stored thereon, which when executed by the one or more processors cause the processors to perform operations comprising:
detecting a transmission capacity associated with the amount of data that the instant messaging application can transmit within one transmission session, further including:
gradually increasing the amount of data to be transmitted by the instant messaging application within the transmission session without actual transmission of any data to another computing device; and
determining the transmission capacity of the transmission session until before the instant messaging application freezes or crashes;
after detecting the transmission capacity, dividing the data into a plurality of data sections according to the determined transmission capacity, wherein the respective amount of data contained in each data section is less than the transmission capacity; and
controlling the instant messaging application to transmit the plurality of data sections sequentially to the other computing device, wherein upon the completion of the transmission of each data section in a subset of the plurality of data sections, the instant messaging application automatically transmits a respective subsequent data section of the plurality of data sections.

11. The computer device of claim 10, wherein the data is selected from a group consisted of text data, image data, audio data and video data.

12. The computer device of claim 10, wherein the computer device includes a sending terminal, and the operation of controlling the application to transmit the plurality of data sections sequentially further includes the operation of:
controlling the application to transmit the plurality of data sections sequentially from the sending terminal to one or more computer devices each including a respective receiving terminal.

13. The computer device of claim 10, wherein the data comprise test data for the application.

14. The computer device of claim 10, wherein at least one of the plurality of data sections includes one or more files.

15. The computer device of claim 10, wherein the data comprises test data including a plurality of files for the application, and each file is identified by an identifier that includes a file name and a file path of the respective file.

16. A non-transitory computer-readable medium, having instructions stored thereon, which when executed by one or more processors cause the processors to perform operations comprising:
detecting a transmission capacity associated with the amount of data that the instant messaging application can transmit within one transmission session, further including:
gradually increasing the amount of data to be transmitted by the instant messaging application within the transmission session without actual transmission of any data to another computing device; and
determining the transmission capacity of the transmission session until before the instant messaging application freezes or crashes;
after detecting the transmission capacity, dividing the data into a plurality of data sections according to the determined transmission capacity, wherein the respective amount of data contained in each data section is less than the transmission capacity; and
controlling the instant messaging application to transmit the plurality of data sections sequentially to the other computing device, wherein upon the completion of the transmission of each data section in a subset of the plurality of data sections, the instant messaging application automatically transmits a respective subsequent data section of the plurality of data sections.

17. The computer-readable medium of claim 16, wherein the data comprise test data for the application.

18. The computer-readable medium of claim 17, wherein the test data comprise a plurality of files.

19. The computer-readable medium of claim 18, wherein controlling the application to transmit the plurality of data sections sequentially comprising providing an identifier for each file to the application.

20. The computer-readable medium of claim 16, wherein the identifier includes a file name and a file path of the respective file.

* * * * *